United States Patent [19]
Patel et al.

[11] Patent Number: 5,225,973
[45] Date of Patent: Jul. 6, 1993

[54] REGULATION CIRCUIT FOR A STEPPED-WAVEFORM INVERTER

[76] Inventors: Sunil Patel, 5630 Inverness Dr., Rockford, Ill. 61107; Chai-Nam Ng, 4118 Florida Dr. #235, Rockford, Ill. 61108; Vietson Nguyen, 8125 Royal Oaks Rd.; P. John Dhyanchand, 2721 Pelham Rd., both of Rockford, Ill. 61107

[21] Appl. No.: 581,924

[22] Filed: Sep. 13, 1990

[51] Int. Cl.⁵ .............................. H02M 1/12
[52] U.S. Cl. ....................... 363/43; 363/37; 363/71; 363/97; 322/28
[58] Field of Search ........... 363/43, 37, 71, 97; 322/28

[56] References Cited

U.S. PATENT DOCUMENTS

| | | |
|---|---|---|
| 3,374,414 | 3/1968 | Garnett ............... 363/43 |
| 3,775,662 | 11/1973 | Compoly et al. . |
| 4,063,143 | 12/1977 | Forstbauer ............ 363/43 |
| 4,494,179 | 1/1985 | Inokuchi et al. . |
| 4,539,514 | 9/1985 | Espelage et al. . |
| 4,562,396 | 12/1985 | Espelage et al. . |
| 4,565,953 | 1/1986 | Espelage et al. . |
| 4,666,020 | 5/1987 | Watanabe ............. 363/43 |
| 4,805,081 | 2/1989 | Chambers et al. . |
| 4,870,557 | 9/1989 | Stacey ................. 363/43 |
| 5,027,265 | 6/1991 | Dhyanchand et al. ...... 363/43 |

OTHER PUBLICATIONS

Article entitled "Which DC/AC Inverter?" appearing in *Electronic Design*, Dec. 6, 1974, by George A. O'Sullivan.

*Primary Examiner*—David Cain
*Attorney, Agent, or Firm*—Marshall, O'Toole, Gerstein, Murray & Bicknell

[57] ABSTRACT

A regulator circuit for an inverter having first and second inverter sections that develop first and second AC waveforms which are phase displaced by a variable angle α wherein the first and second AC waveforms are combined to produce AC output power includes a reference signal generator that develops a reference signal having a transition between two states at a first time, a memory storing a plurality of words each representing a value of α add a circuit for accessing the memory with a deviation signal such that the memory provides a word at an output thereof. A counter is provided and a timing circuit causes the counter to load the word at a time prior to the first time. At the first time a gating circuit provides a plurality of clock pulses to a clock input of the counter whereby the counter decrements the loaded word as the clock pulses are received by the counter. A zero detect circuit and a one-shot coupled to the output of the counter produce a synchronization signal having a transition between two states at a second time subsequent to the first time when the loaded word is decremented to a particular value. The first and second inverter sections are controlled in accordance with the reference signal and the synchronization signal so that the parameter of the AC power is maintained substantially at a particular level.

16 Claims, 9 Drawing Sheets

REGULATION CIRCUIT FOR A STEPPED-WAVEFORM INVERTER

TECHNICAL FIELD

The present invention relates generally to DC/AC converters, and more particularly to a regulator for an inverter.

BACKGROUND ART

There is frequently a need to obtain constant-frequency AC power from variable-speed motive power produced by a prime mover. For example, in aircraft and aerospace applications, variable-frequency AC power produced by a brushless, synchronous generator driven by an aircraft jet engine is converted by a rectifier bridge and a DC link filter into DC power on first and second DC link conductors. A static inverter coupled to the DC link conductors converts the DC power into constant-frequency AC power which is filtered and applied to frequency-sensitive AC loads. If necessary or desirable, DC power for DC loads may be obtained directly from the rectifier bridge or from a rectifier coupled to the output of the static inverter. The rectifier bridge coupled to the generator and the inverter together with associated components comprise a power converter known as a variable-speed, constant-frequency (VSCF) system.

The inverter used in VSCF systems may either be of the pulse-width modulated (PWM) type or the stepped-waveform type. An example of the latter type of inverter is disclosed in Compoly, et al., U.S. Pat. No. 3,775,662. The inverter includes first through fourth inverter bridges coupled to first through fourth sets of three-phase primary windings of a summing transformer. The first and third sets of primary windings are connected in a wye configuration whereas the second and fourth sets of primary windings are connected in a delta configuration. A secondary winding is associated with each primary winding of the summing transformer and each secondary winding is connected in series with other secondary windings of the same phase to form three sets of series-connected windings. A 24-step summed voltage is developed across the series-connected secondary windings. The first and third inverter bridges are operated to produce identical waveforms in the first and third sets of primary windings except that the waveforms produced by the third inverter bridge are displaced 15° with respect to the waveforms produced by the first inverter bridge. Likewise, the waveforms produced by the second and fourth inverter bridges are identical, except that the waveforms of the latter lag the former by 15°. In the event of an overload condition at the inverter output, the phase relationship of the voltages from the inverter bridges is changed, so that the AC power from the summing transformer is reduced to a safe level. When the overload condition subsequently disappears, the original phase relationship of the voltages is restored so that normal operation can continue.

An article entitled "Which DC/AC Inverter?" appearing in *Electronic Design*, Dec. 6, 1974, by George A. O'Sullivan discloses a 24-step waveform inverter similar to that disclosed in Compoly, et al. having four square-wave generators coupled to a summing transformer. This article indicates that output voltage control is possible utilizing a phase shifter which shifts two of the waveforms produced by two of the square wave generators with respect to the waveforms produced by the remaining generators. A feedback network is coupled between an output of the inverter and the phase shifter and a six-stage Johnson counter is coupled between the phase shifter and the square wave generators that develop the shifted waveforms.

Inokuchi, et al., U.S. Pat. No. 4,494,179 discloses a power conversion system including first and second power converters, one of which operates as a rectifier and the other of which operates as an inverter together with regulation circuitry for regulating DC power flowing between the converters and a control for operating the inverter.

Espelage et al., U.S. Pat. No. 4,565,953, discloses an AC motor drive wherein paralleled outputs of first and second current controlled inverters are applied to a motor. The phase displacement between outputs of the inverters is controlled to be equal to a certain phase displacement, such as 30°.

Chambers et al., U.S. Pat. No. 4,805,081, discloses an inverter system wherein the outputs of first and second resonant inverters are combined and applied to a load. The phase displacement between the outputs of the inverters is controlled to in turn control the output current delivered to the load.

SUMMARY OF THE INVENTION

In accordance with the present invention, a regulator circuit for a stepped-waveform inverter regulates the output of the inverter in a simple and effective fashion.

In accordance with a broad aspect of the present invention, a circuit for producing an output signal having a transition between two states at a controlled phase displacement with respect to a transition between two states of a reference signal includes means for deriving a phase command value representing a desired phase displacement between the transitions in the output signal and the reference signal, a counter coupled to the deriving means having a series of counter inputs that receive the phase command value, a load command input, a clock input and an output and means coupled to the load command input for causing the counter to load the phase command value at a time prior to the transition in the reference signal. A gating circuit is provided having inputs that receive a clock signal developed by a clock and the reference signal and an output coupled to the clock input of the counter wherein the gating circuit provides a plurality of clock pulses to the clock input of the counter following the transition in the reference signal whereby the counter decrements the loaded phase command value as clock pulses are received by the counter. Means are coupled to the counter output for producing the output signal wherein the developing means produces the transition in the output signal when the loaded phase command value is decremented to a particular value.

Preferably, the causing means comprises a timing circuit responsive to a second reference signal that is identical to the first reference signal except shifted in time relative to thereto. The deriving means comprises a memory having addressing inputs which receive an address and a series of outputs at which the phase command value is developed.

Also in accordance with the preferred embodiment, the producing means comprises a zero detect circuit that produces a zero detect signal when the loaded phase command value is decremented to zero and a one-shot coupled to the zero detect circuit that develops a pulse in the output signal when the zero detect signal is produced.

The gating circuit preferably includes a flip-flop having a set input that receives the output signal, a reset input that receives the first reference signal and an output and an AND gate having a first input that receives the first reference signal, a second input that receives the clock signal, a third input coupled to the output of the flip-flop and an output coupled to the clock input of the counter.

In accordance with a further aspect of the present invention, a regulator circuit for a stepped-waveform inverter having first and second subinverters coupled to first and second primary windings of a summing transformer wherein the summing transformer includes a secondary winding in which summed AC output power is produced and wherein the subinverters develop first and second waveforms phase displaced by a variable angle $\alpha$ includes first means for developing a reference signal having a transition between two states at a first time, second means for developing a deviation signal representing the deviation of a parameter of the AC output power from a particular level and a memory storing a plurality of words each representing a value of $\alpha$. Means are provided for accessing the memory with the deviation signal such that the memory provides a word at an output thereof representing a value of $\alpha$ corresponding to the deviation signal. A counter having counter inputs coupled to the memory, a clock input and an output is provided together with means coupled to the counter for causing the counter to load the word at a time prior to the first time. A gating circuit includes an input coupled to the first developing means and is operative beginning at the first time to provide a plurality of clock pulses to the clock input of the counter whereby the counter decrements the loaded word as the clock pulses are received by the counter. Means are coupled to the counter outputs for producing a synchronization signal having a transition between two states at a second time subsequent to the first time when the loaded word is decremented to a particular value. Means are coupled to the first and second subinverters for controlling same in accordance with the reference signal and the synchronization signal such that the parameter of the AC output power is maintained substantially at the particular level.

In accordance with a still further aspect of the present invention, a regulator circuit for a stepped-waveform inverter having first and second three-phase subinverters, a summing transformer having first and second sets of three-phase primary windings coupled to the first and second subinverters, respectively, and a set of three-phase secondary windings in which three-phase, summed AC output power is produced wherein the subinverters develop first and second sets of three-phase waveforms which are phase displaced by a variable angle includes first means for developing a first reference signal having a transition between two states at a first time, second means for developing a deviation signal representing a deviation of a parameter of the AC output power from a particular level and a memory storing a plurality of words each representing a value of $\alpha$. Means are provided for accessing the memory with the deviation signal such that the memory provides a word at an output thereof representing a value of $\alpha$ corresponding to the deviation signal. A counter is provided having counter inputs coupled to the memory, a clock input and an output and a timing circuit is responsive to a second reference signal for causing the counter to load the word at time prior to the first time. A gating circuit includes an input coupled to the first developing means and is operative beginning at the first time to provide a plurality of clock pulses to the clock input of the counter whereby the counter decrements the loaded word as the clock pulses are received by the counter. A zero detect circuit produces a zero detect signal when the loaded word is decremented to zero and a one-shot coupled to the zero detect circuit develops a pulse in a synchronization signal when the zero detect signal is produced. Means are coupled to the first and second subinverters for controlling same in accordance with the reference signal and the synchronization signal such that the parameter of the AC output power is maintained substantially at the particular level.

In accordance with yet another aspect of the present invention, a regulator circuit for a stepped-waveform inverter having first and second three-phase subinverters coupled to first and second sets of three-phase primary windings of a summing transformer wherein the summing transformer further includes a set of three-phase secondary windings in which three-phase, summed AC output power is produced and wherein the subinverters develop first and second sets of three-phase waveforms displaced relative to one another by a variable angle $\alpha$ includes first means for developing a first reference signal having a transition between two states at a first time, second means for developing a deviation signal representing a deviation of a parameter of the AC output power from a particular level and a memory storing a plurality of words each representing a value of $\alpha$. Means are provided for accessing the memory with the deviation signal such that the memory provides a word at an output thereof representing a value of $\alpha$ corresponding to the deviation signal wherein the accessing means comprises an analog/digital converter coupled between the second developing means and the memory which supplies a digital representation of the deviation signal to the memory prior to the first time. A counter is provided having counter inputs coupled to the memory, a clock input and an output and a timing circuit is responsive to a second reference signal for causing the counter to load the word at a time prior to the first time. The memory includes an enable input that receives the signal developed by the timing circuit whereby the memory provides the word at the memory output after the digital representation of the deviation signal is supplied to the memory. A gating circuit is responsive to the first developing means and a clock signal produced by a clock and is operative beginning at the time to provide a plurality of clock pulses to the clock input of the counter whereby the counter decrements the loaded word as a the clock pulses are received by the counter. A zero detect circuit produces a zero detect signal when the loaded word is decremented to zero and a one-shot coupled to the zero detect circuit develops a pulse in a synchronization signal when the zero detect signal is produced. The gating circuit includes a flip-flop and an AND gate wherein the flip-flop has a set input that receives the synchronization signal, a reset input that receives the first reference signal and an output and wherein the AND gate includes a first input that receives the first reference signal, a second input that receives the clock signal, a third input coupled to the output of the flip-flop and an output coupled to the clock input of the counter. Means are coupled to the first and second subinverters for controlling same in accordance with the reference signal and the synchronization signal such that the parameter of the AC output power is maintained substantially at the particular level.

The present invention accurately regulates the output of an inverter and is relatively insensitive to environmental and aging effects. Further, the minimum phase shift between outputs of the subinverters can be accurately set by storing appropriate data in the memory.

BRIEF DESCRIPTION OF THE DRAWINGS

FIG. 10 is a waveform diagram illustrating a phase output-to-neutral voltage produced in the secondary windings of the summing transformer of FIGS. 4A-4C.

DESCRIPTION OF THE PREFERRED EMBODIMENT

Figure 1:
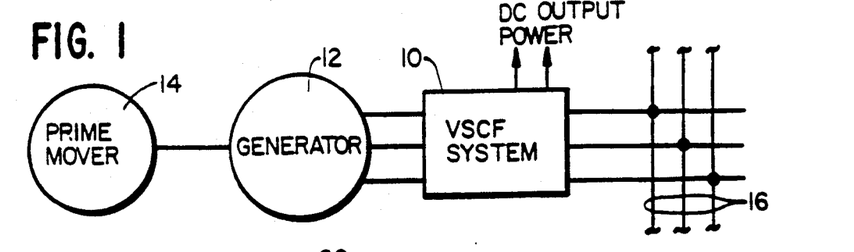
FIG. 1 comprises a block diagram of a generator and VSCF power conversion system for converting variable-speed motive power produced by a prime mover into AC output power and constantfrequency electrical AC power.

Referring now to FIG. 1, a variable-speed constant-frequency (VSCF) system 10 and a brushless, synchronous generator 12 together convert variable-speed motive power produced by a prime mover 14, such as an aircraft jet engine, into constant-frequency electrical AC power on an AC load bus 16. If desired, DC power for DC loads may also be developed by the VSCF system 10. It should be noted that contactors located between the VSCF system 10 and the AC load bus 16 are not shown for the sake of simplicity.

Figure 2:
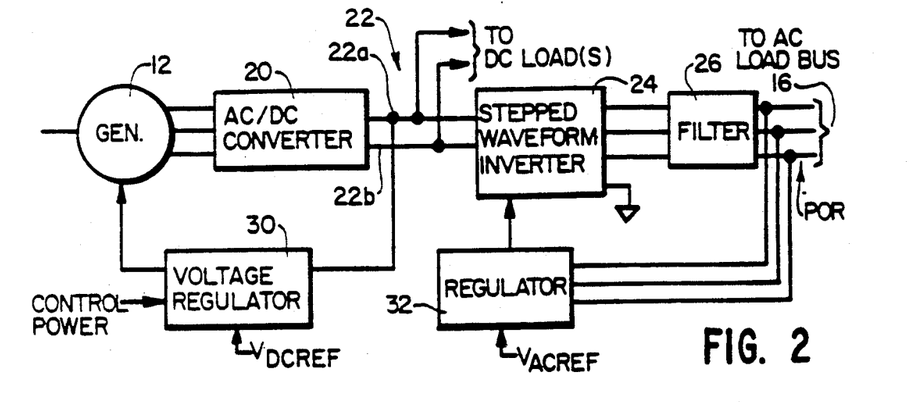
FIG. 2 is a block diagram of the VSCF system of FIG. 1.

As seen in FIG. 2, the VSCF system 10 includes an AC/DC converter 20 which converts the variable-frequency power produced by the generator 12 into the DC power. The DC power is developed on a DC link 22 comprising first and second DC link conductors 22a, 22b. The DC link conductors 22a, 22b are coupled to a stepped-waveform inverter 24 which converts the DC power on the DC link 22 into single or polyphase constant-frequency AC power which may be filtered by an optional filter 26 and provided to the load bus 16.

The DC power for the DC loads may be obtained directly from the DC link conductors 22a, 22b. This voltage is regulated by a voltage regulator 30 which is connected between the DC link conductor 22a and the generator 12. The voltage regulator 30, as noted in greater detail hereinafter, compares the voltage on the DC link conductor 22a against a DC reference $V_{DCREF}$ and modulates the flow of control power to an exciter of the generator 12 to regulate the voltage on the DC link 22.

The deviation of a parameter of the power produced by the stepped-waveform inverter 24 downstream of the filter 26 at a point of regulation (POR) from a reference level represented by a signal $V_{ACREF}$ is detected by a regulator 32 and this deviation is utilized to operate the stepped-waveform inverter 24 to maintain the output parameter substantially at a regulated AC value.

Figure 3:
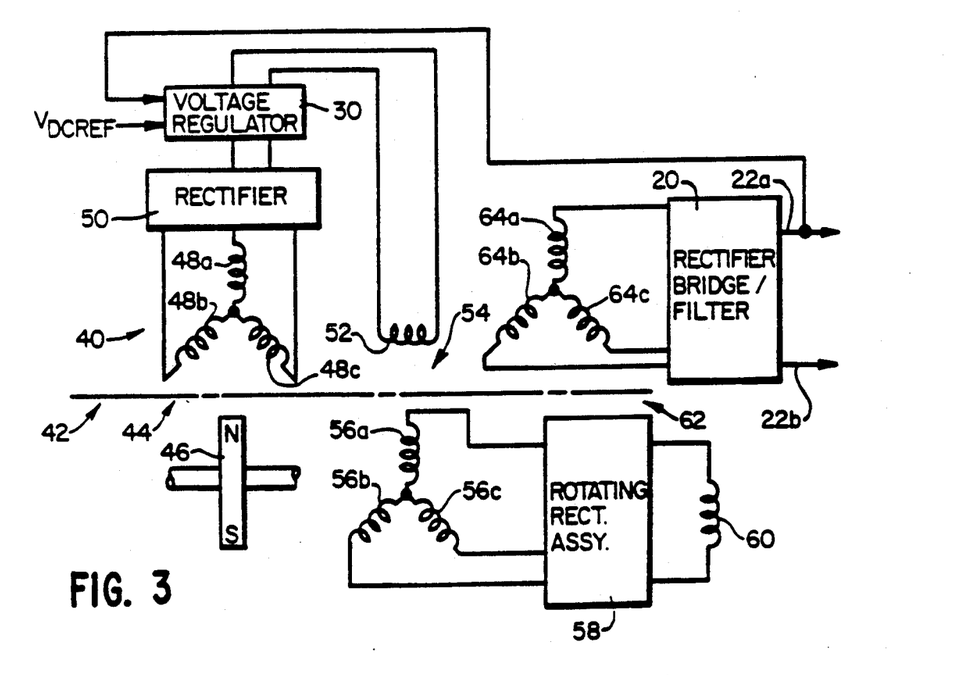
FIG. 3 comprises a combined schematic and block diagram of the generator and AC/DC converter of FIG. 2.

Referring now to FIG. 3, the generator 12 includes a stator 40 within which stator components are disposed and a rotor 42 on which rotor components are disposed. The generator 12 comprises a permanent magnet generator (PMG) 44 including a permanent magnet rotor assembly 46 and a set of armature windings 48 in which the control power is developed. The armature windings 48 are coupled through a rectifier assembly 50 and the voltage regulator 30 to a field winding 52 of an exciter 54. Rotation of the rotor 42 as field current is flowing in the field winding 52 induces a three-phase voltage in three-phase armature windings 56a-56c of the exciter 54. The AC power induced in the windings 56a-56c is converted into DC power by a rotating rectifier assembly 58 and is supplied to a field winding 60 of a main generator is flowing in the field winding 60 causes three-phase voltages to be induced in armature windings 64a-64c of the main generator portion 62. The armature windings 64a-64c are coupled to the AC/DC converter 20 which, in the preferred embodiment, comprises a rectifier bridge/filter of conventional design.

Figure 4A:
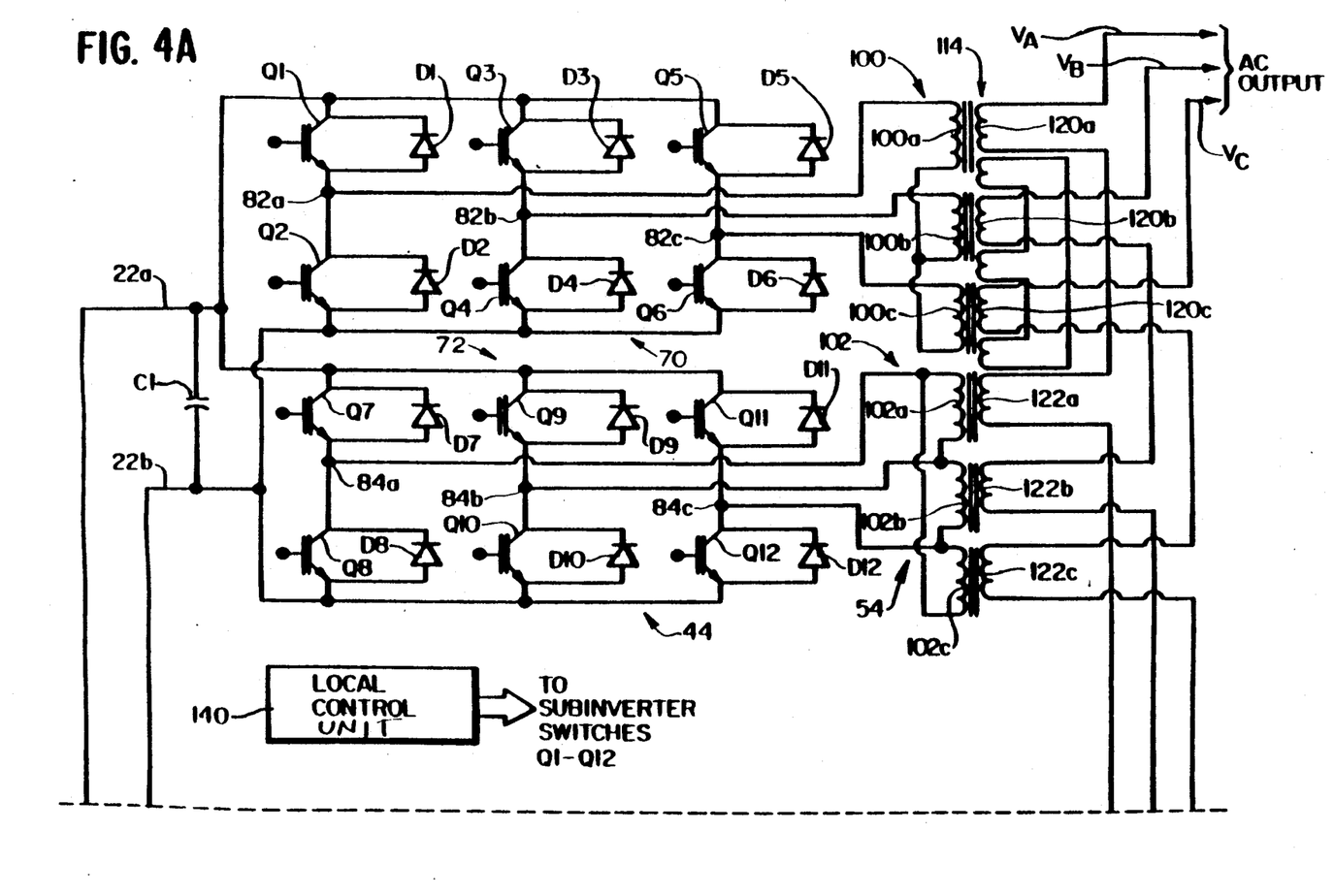
FIGS. 4A, 4B and 4C, when joined along the dashed lines with FIG. 4A at the top, FIG. 4B in the middle and FIG. 4C at the bottom, together comprise a combined schematic and block diagram of the stepped-waveform inverter of FIG. 2.
Figure 4B:
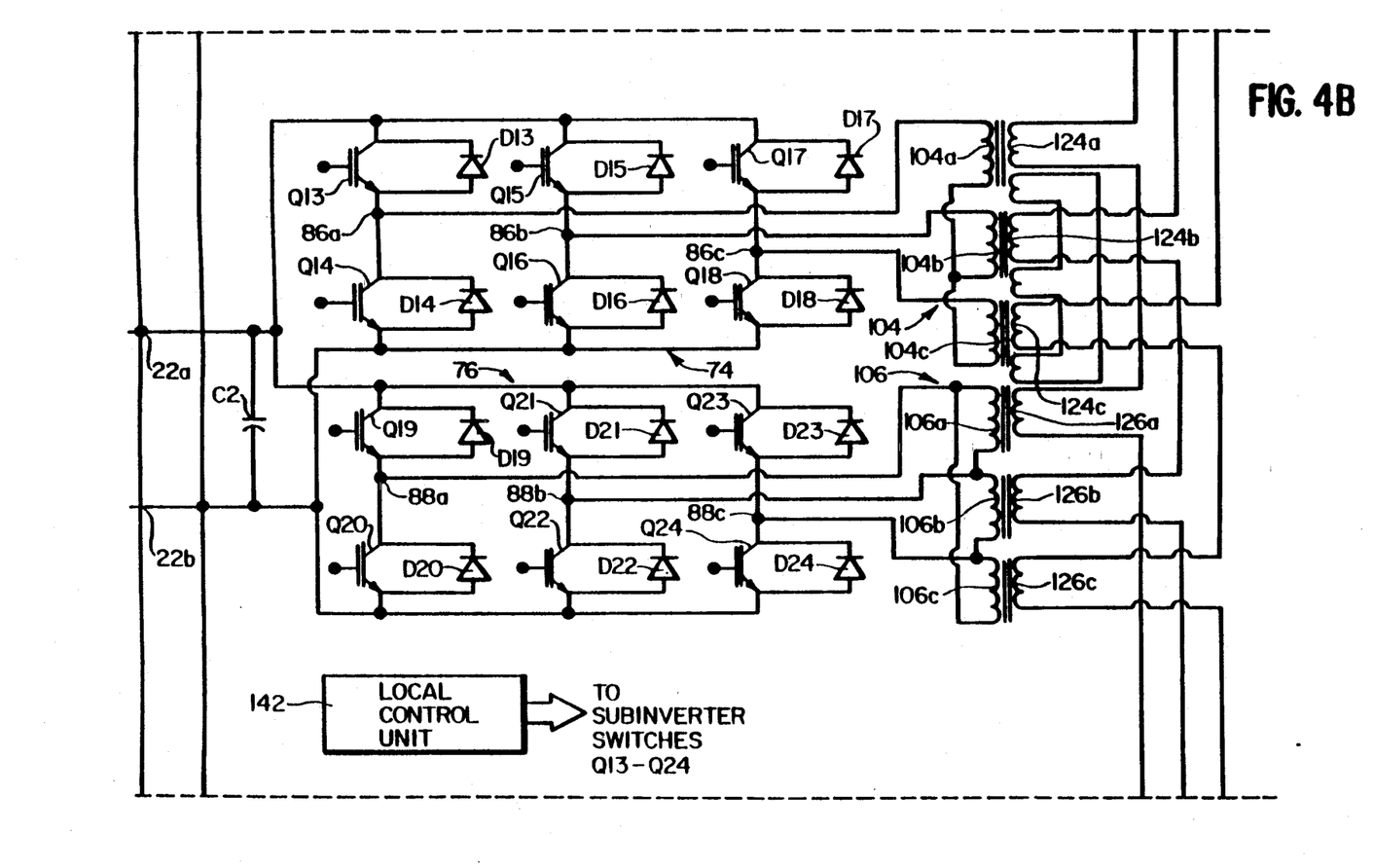
Figure 4C:
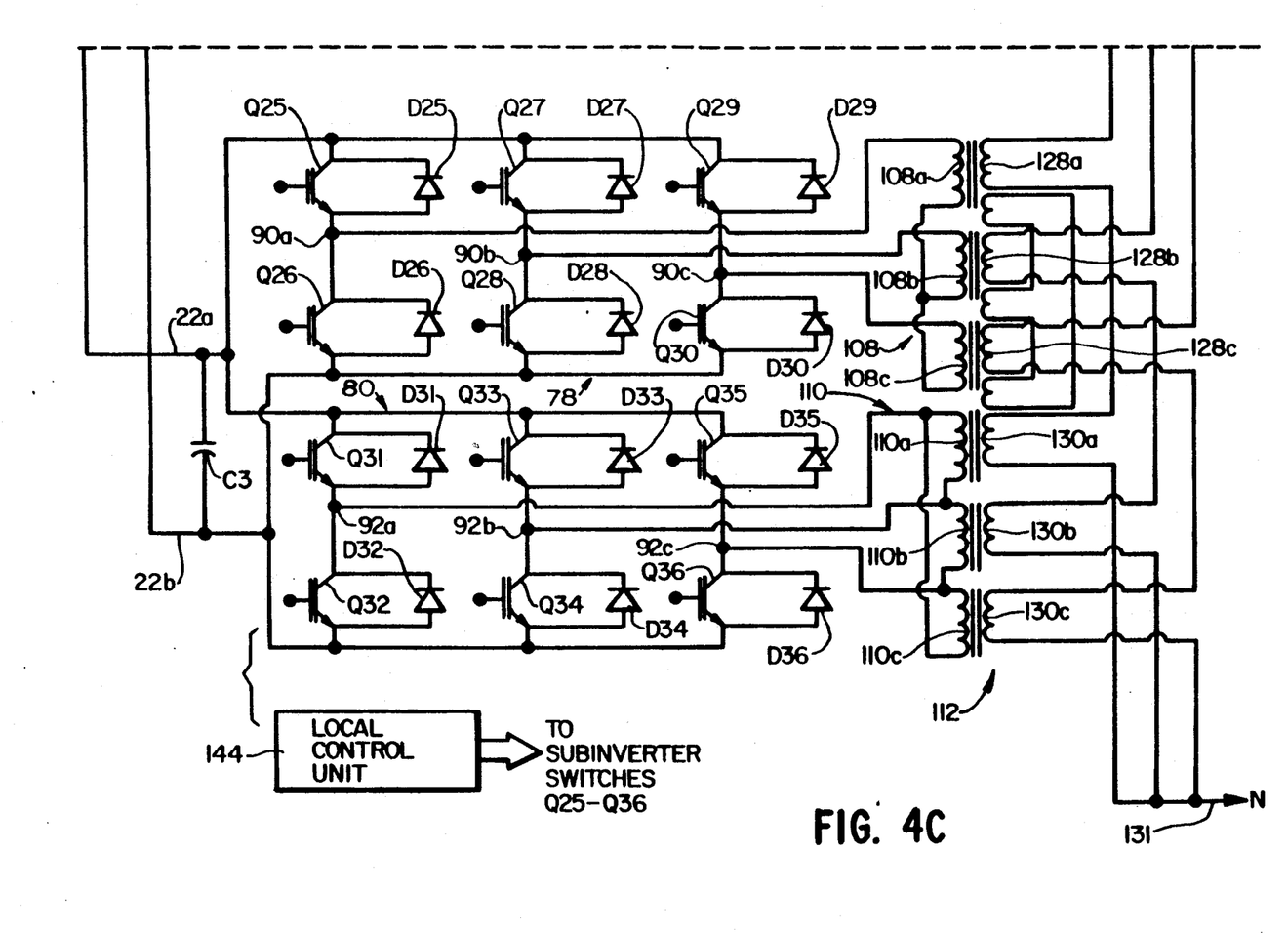

Referring now to FIGS. 4A-4C, the converter 20 is coupled by the DC link conductors 22a, 22b and capacitors C1, C2 and C3 to first through sixth subinverters 70, 72, 74, 76, 78 and 80 which are shown in simplified form. The subinverters 70, 72, 74, 76, 78 and 80 include power switches Q1-Q6, Q7-Q12, Q13-Q18, Q19-Q24, Q25-Q30 and Q31-Q36, respectively, which are connected together in a bridge configuration. The power switches Q1-Q36 are preferably transistors, although they may be different devices, such as thyristors. In the former case, the transistors Q1-Q36 may be of the conventional bipolar type or may be of the insulated gate bipolar type (IGBT) or any other type having suitable current and voltage handling capabilities. Flyback diodes D1-D36 are coupled across the power switches Q1-Q36, respectively.

Phase outputs 82a-82c, 84a-84c, 86a—86a, 88a-88c, 90a-90c and 92a-92c are coupled to first through sixth sets of primary windings 100, 102, 104, 106, 108 and 110 of a summing transformer 112. The summing transformer 112 further includes a set of three-phase secondary windings 114 which are connected in a wye configuration and across which a three-phase, summed voltage is produced. More specifically, the first, third and fifth sets of primary windings 100, 104, 108 include windings 100a-100c, 104a-104c and 108a-108c which are connected together in star or wye configuration. The remaining sets of primary windings 102, 106 and 110 include windings 102a-102c, 106a-106c and 110a-110c which are connected together in a delta configuration. Associated with each primary winding 100a-110c is a secondary winding 120a-130c, respectively. The windings 120a, 122a, 124a, 126a, 128a and 130a are connected in series as are the windings 120b-130b and the windings 120c-130c. The free ends of the windings 130a, 130b and 130c are connected together to form a neutral terminal 131 while the AC output is produced at the free ends of the windings 120a, 120b and 120c.

Figure 5:
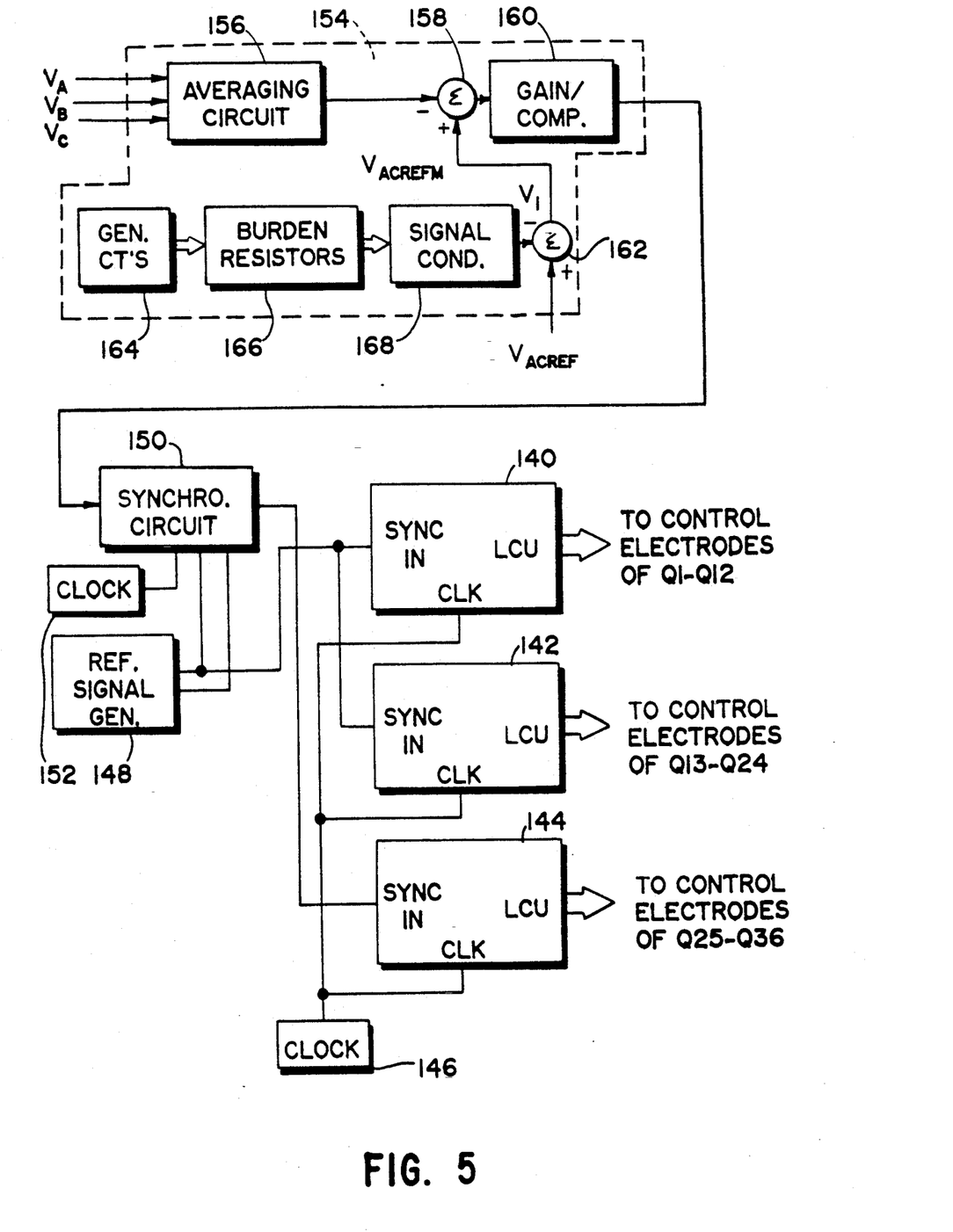
FIG. 5 is a block diagram of the regulator of FIG. 3 together with a block diagram illustrating the interconnection of the local control units of FIGS. 4A-4C.

The power switches Q1-Q12 of the subinverters 70, 72 are operated by a local control unit (LCU) 140. Likewise, the switches Q13-Q24 of the subinverters 74, 76 are operated by an LCU 142 while the switches Q25-Q36 of the subinverters 78, 80 are operated by an LCU 144. The subinverters 70-80 produce eighteen rectangular waveforms, six of which 145a-145f are illustrated and described hereinafter in conjunction with FIG. 9. One phase voltage of the AC output power relative to the neutral is illustrated in FIG. 10. As seen in FIG. 5, the LCU's 140-144 receive a clock signal developed by a clock 146. In addition, the LCU's 140, 142 receive a first reference signal REF1 developed by a reference signal generator 148 while the LCU 144 receives a synchronization signal developed by a synchronization circuit 150. The reference signal generator 148 and/or the clock 146 may be a part of a master control unit or may be separate circuits, as desired. The reference signal generator 148 and the synchronization circuit 150 develop waveforms that control the output phase and frequency of the waveforms produced by the subinverters 70-76, as noted in greater detail hereinafter.

The synchronization circuit 150 is responsive to a clock signal developed by a clock 152 as well as a deviation signal developed by a deviation signal developing circuit 154. The circuit 154 includes an averaging circuit 156 which develops an average signal representing the average level of the phase voltages $V_A$, $V_B$, and $V_C$ developed across the set of secondary windings 114. The average signal is subtracted by a summer 158 from a modified reference signal $V_{ACREFM}$ to obtain an error signal which is processed by a gain and compensation circuit 160 to obtain the deviation signal.

The modified reference signal $V_{ACREFM}$ is developed by a summer 162 that subtracts a signal $V_1$ from the signal $V_{ACREF}$. The signal $V_1$ is developed by a set of generator current transformers 164 located witnin a housing of the generator, a set of burden resistors 166, and a signal conditioning network 168. The network 168 includes rectifiers that rectify a set of threephase voltages representing the currents in the generator phases as developed across the burden resistors 166 and the op amp that averages the rectified three-phase voltages. The signal $V_1$ thus represents the total load on the generator 12.

Figure 9:
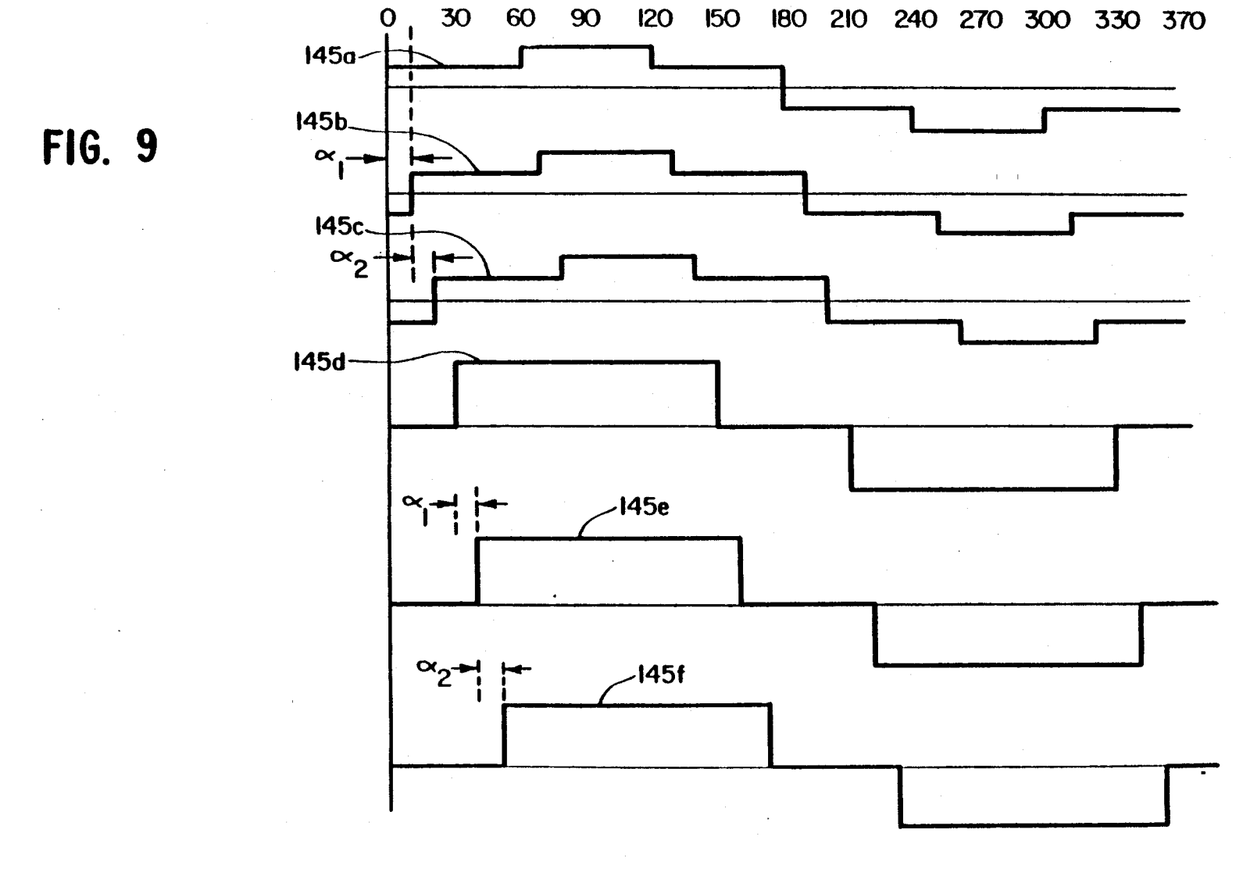
FIG. 9 comprises a series of waveform diagrams illustrating one phase of waveforms produced by the subinverters of FIGS. 4A-4C.

The first and second subinverters 70, 72 are operated by the LCU 140 to produce two sets of three-phase rectangular waveforms. Phase A waveforms 145a and 145d are produced by the subinverters 70, 72, respectively, as shown in FIG. 9. The subinverters 74 and 76 are operated by the LCU 142 to produce two sets of three-phase rectangular waveforms while the subinverters 78 and 80 are operated by the LCU 144 to produce two sets of three-phase rectangular waveforms. Phase A waveforms 145b, 145e, 145c, and 145f produced by the subinverters 74, 76, 78, and 80, respectively, are also shown in FIG. 9. As is evident from an inspection of FIG. 9, the waveforms 145a-145c are identical as are the waveforms 145d-145f, except for differences in phase displacement. More particularly, the waveform 145b lags the waveform 145a by a phase displacement $\alpha_1$ while the waveform 145c lags the waveform 145b by a phase displacement $\alpha_2$. Similarly, the waveform 145e lags the waveform 145d by the angle $\alpha_1$ while the waveform 145f lags the waveform 145e by the phase displacement $\alpha_2$. In the preferred embodiment, the angle $\alpha_1$ is constant during operation and the angle $\alpha_2$ is varied by the local control unit 144 to accomplish voltage regulation. This is effected by the synchronization circuit 150 which causes the LCU 144 to vary the angle $\alpha_2$ in accordance with the deviation signal.

It should be noted that the angle $\alpha_1$ may instead be variable and the angle $\alpha_2$ fixed to thereby accomplish the same result, if desired. Further, both angles $\alpha_1$ and $\alpha_2$ may be variable to afford a greater degree of regulation.

Figure 6:
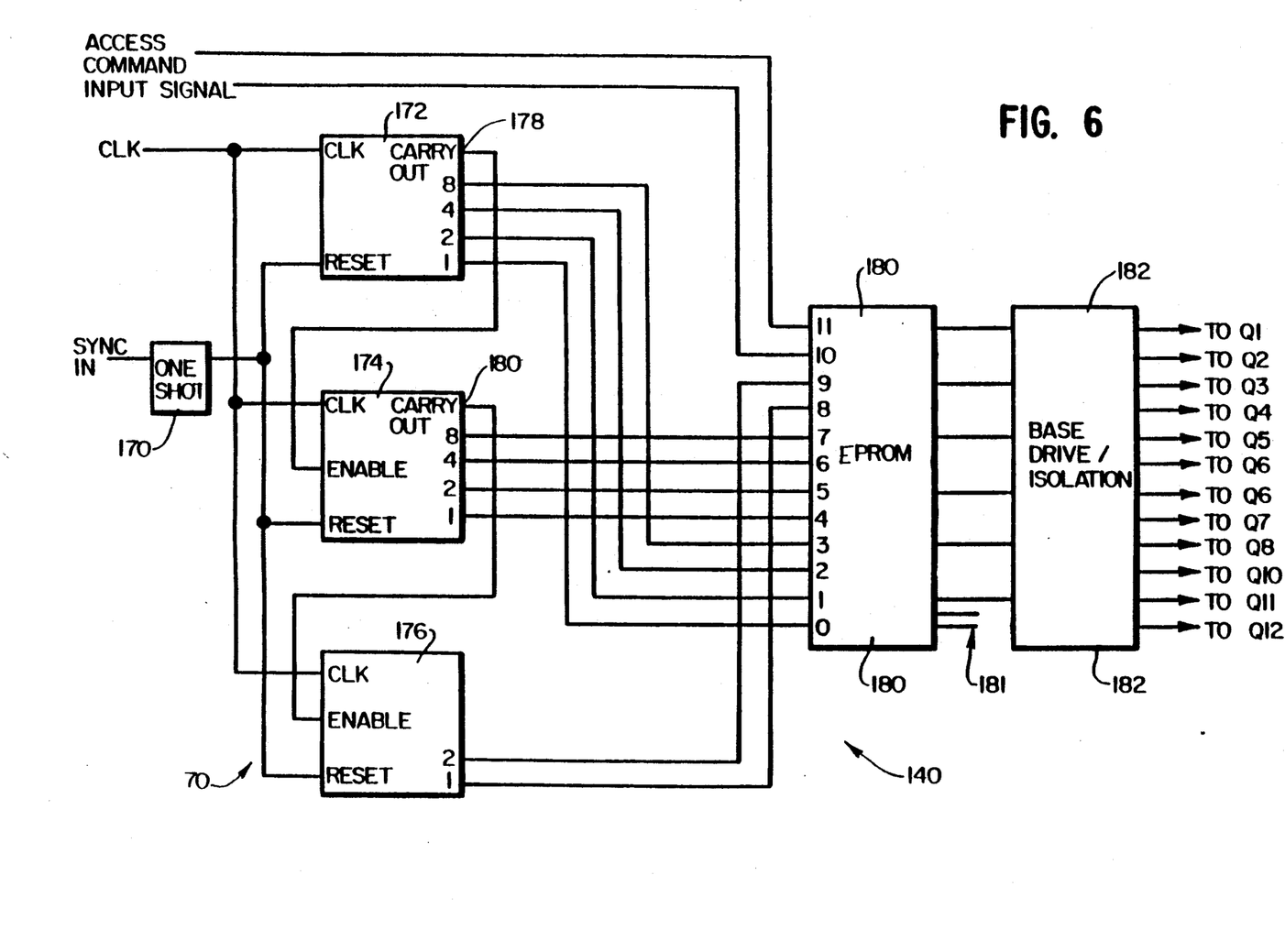
FIG. 6 comprises a block diagram illustrating the design of the local control units of FIG. 5.

FIG. 6 illustrates the LCU 140 in greater detail, it being understood that the LCU's 142 and 144 are identical thereto, with the exceptions noted below. The LCU 140 includes a gating circuit in the form of a one-shot 170 which receives the first reference signal developed by the reference signal generator 148. The one-shot 70 is coupled to reset inputs of first through third four-bit counters 172, 174 and 176, respectively. In the case of the LCU 144, the one-shot 70 is omitted and the synchronization signal developed by the circuit 150 is provided directly to the reset inputs of the counters 172, 174, and 176. The counters 172-176 further include clock inputs which receive clock pulses produced by the clock 146. A ripple carry output 178 of the counter 172 is coupled to an enable input of a counter 174 while a ripple carry output 180 of the counter 174 is coupled to an enable input of the counter 176. A four-bit output of the counter 172 is coupled to memory address inputs 0-3 of a memory 180 which may comprise, for example, an EPROM. Memory address inputs 4-7 of the memory 180 receive a four-bit output from the counter 174 whereas memory address inputs 8 and 9 receive the two lowest order output bits from the counter 176. A further pair of memory address inputs 10 and 11 receive an access command input signal which may be provided by a master control unit or which may be provided by a signal generator that is separate from or a part of the LCU 140.

The memory 180 stores data for operating the subinverters 70, 72 so that they produce the first and second sets of three-phase waveforms, respectively. In the preferred embodiment, the memory 180 includes four kilobytes of storage wherein the data stored in three of the kilobytes are used to control the subinverters 70-80. Each byte consists of eight bits of data. A one kilobyte block of memory contains the data required for controlling the subinverters 70, 72 whereas different one kilobyte blocks of memory contain the data required to control the subinverters 74, 76 and 78, 80. The access command input signal selects the appropriate block of memory and the counters 172, 174, 176 sequentially access the storage locations of the selected block so that a sequence of eight-bit words are provided at an output 181 of the memory 180. Six of the eight bits are used to generate the waveforms produced by the subinverters 70, 72. Each bit controls one leg of an inverter. For example, the data provided at bit position 1 of the bytes control the switches Q1 and Q2, the data provided at bit position 2 control the switches Q3 and Q4 and the data provided at bit position 3 control the switches Q5 and Q6. Similarly, the data appearing at bit positions 4, 5 and 6 control the switches Q7, Q8 and Q9, Q10 and Q11, Q12, respectively. The frequency of the clock 146 is selected to be $2^{10}/2.5\times10^{-3}=409.6$ kHz to produce output waveforms from the subinverters 70-80 at a desired frequency of 400 Hz.

The bits retrieved from the memory 180 are delivered to a base drive/isolation circuit 182 which may be of conventional design. The circuit 182 develops complimentary base drive signals for the switches of each subinverter leg from the data provided by the memory 182. For example, a high state bit in bit position 1 is utilized to develop a high state base drive signal for the transistor Q1 and a low state base drive signal for the transistor Q2. A low state bit in this bit position results in a low state base drive signal for the transistor Q1 and a high state base drive signal for the transistor Q2. The base drive signals are isolated and amplified as needed and protection against simultaneous conduction of both transistors in each leg is provided by the circuit 182.

Figure 7:
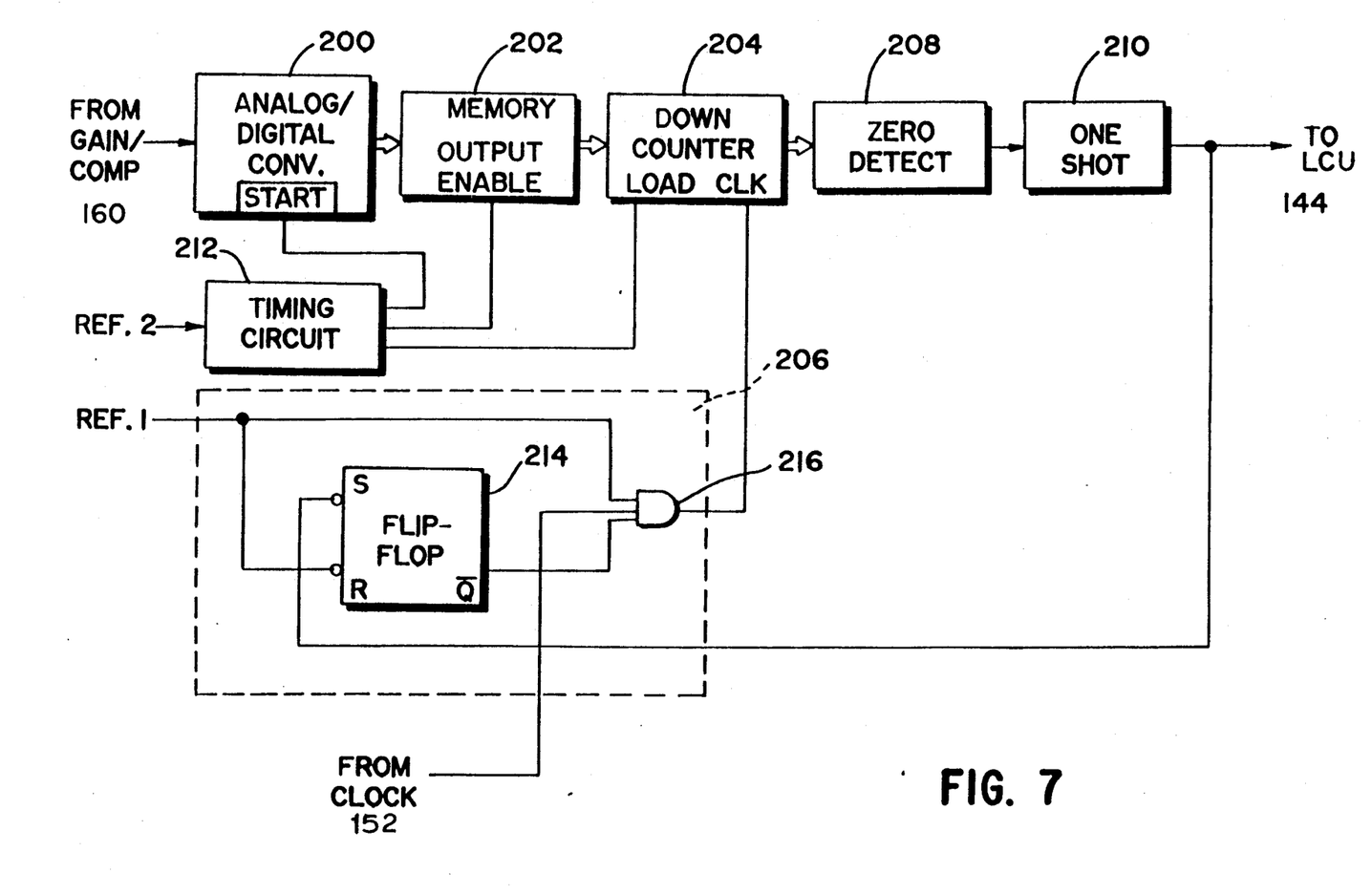
FIG. 7 comprises a block diagram of the synchronization circuit 150 of FIG. 5.

FIG. 7 illustrates the synchronization circuit 150 in greater detail. The circuit 150 includes accessing means comprising an analog/digital converter 200 which is coupled to the output of the gain and compensation circuit 160. The analog/digital converter 200 converts the analog deviation signal into a digital signal that is provided to address inputs of a memory 202 which may comprise, for example, a ROM. Stored in the memory is a plurality of words each representing a value of $\alpha_2$.

The memory 202 includes outputs that are coupled to inputs of a down counter 204 having a clock input that receives clock pulses developed by a gating circuit 206 described in greater detail hereinafter. The counter 204 includes outputs coupled to a zero detect circuit 208 which is a combinational logic circuit that develops a signal having a transition between two states when the outputs of the down counter 204 are all equal to zero. The zero detect circuit 208 is in turn coupled to a one-shot 210 that produces the synchronization signal which is supplied to the LCU 144.

The analog/digital converter 200, the memory 202 and the down counter 204 include a start input, an output enable input and a load input, respectively, that receive signals developed by a timing circuit 212. The timing circuit 212 receives a second reference signal REF2 developed by the reference signal generator 148.

The gating circuit 206 includes a flip-flop 214 of the RS type having an inverting reset input that receives the first reference signal REF2 and a set inverting input that receives the synchronization signal developed by the one-shot 210. The flip-flop 214 includes an inverting output coupled to one input of an AND gate 216. Further inputs of the AND gate 216 receive the first reference signal REF1 and the clock signal developed by the clock 152.

The gating circuit 206 develops a series of clock pulses which are delivered to the clock input of the down counter 204 as noted in greater detail hereinafter.

Figure 8:
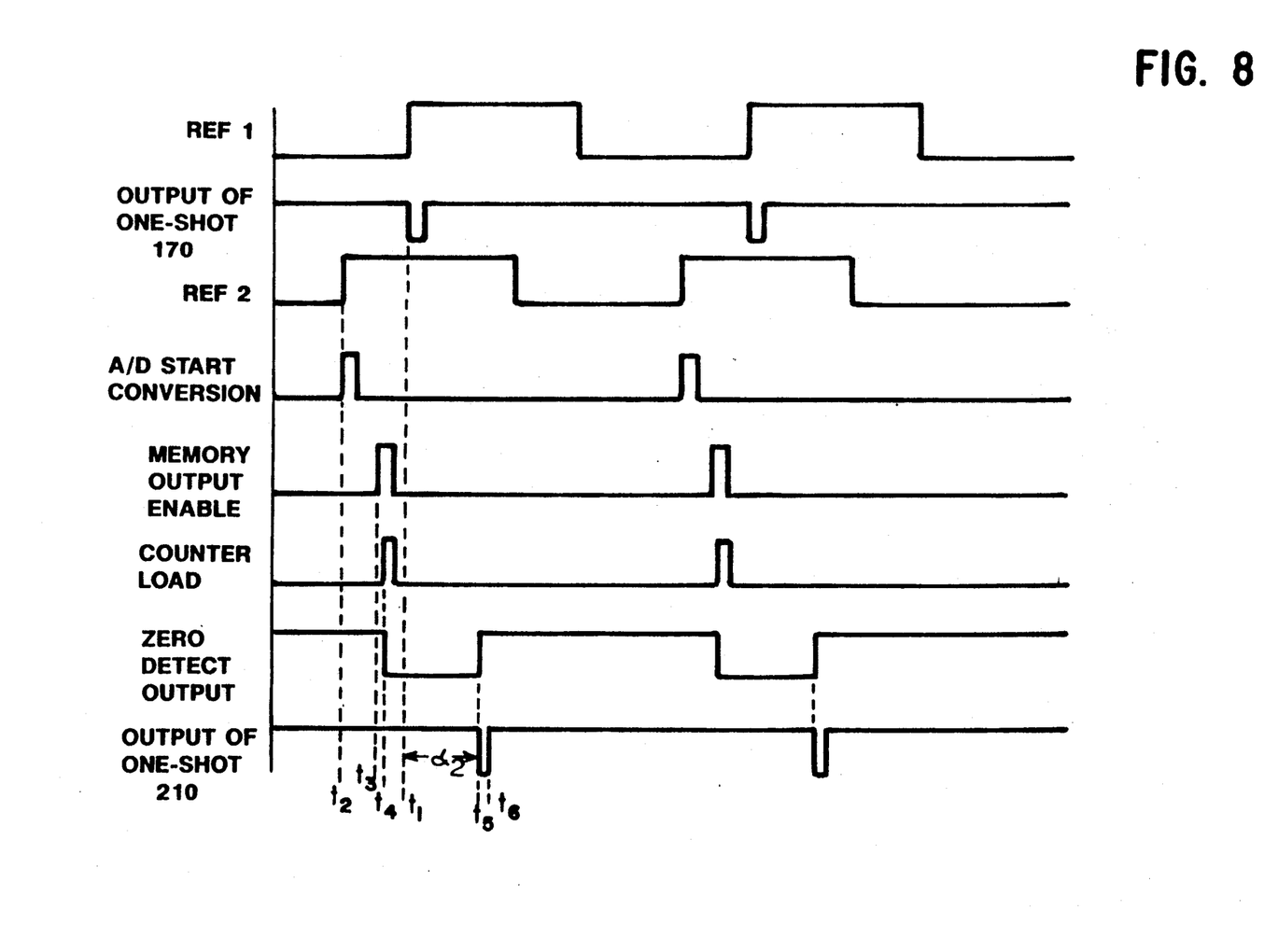
FIG. 8 comprises a series of waveform diagrams illustrating the operation of the synchronization circuit 150 of FIG. 7.

Referring also to FIG. 8, the first reference signal REF1 comprises a rectangular waveform which, for example, switches between low and high states at a time $t_1$. As noted in greater detail hereinafter, the first reference signal REF1 synchronizes the LCU's 140, 142. At a time $t_2$ prior to the time $t_1$, the second reference signal REF2 switches between low and high states, in turn causing the timing circuit 212 to develop a start conversion signal for the analog/digital converter 200. At a time $t_3$ subsequent to the time $t_2$ by which the output of the analog/digital converter 200 has stabilized, a memory output enable signal is developed by the timing circuit 212 and is provided to the output enable input of the memory 202 so that the memory 202 is accessed with the digital representation of the deviation signal. Shortly after the time $t_3$ at a time $t_4$ by which the output of the memory 202 has stabilized, the timing circuit 212 develops a counter load command signal which is supplied to the load input of the down counter 204. The counter is thus commanded to load the phase command word or value appearing at the output of the memory 202. As a result of such loading, the output of the zero detect circuit 208 drops to a low state. It should be noted that the time $t_4$ is sufficiently prior to the time $t_1$ to ensure that the down counter 204 is loaded with the output of the memory 202 by the time $t_1$.

As previously noted, the first reference signal REF1 changes to a high state at the time $t_1$. This, in turn, resets the flip-flop 214 and causes the inverting output of the flip-flop 214 to switch to a high state. The AND gate 216 is thus enabled and passes clock pulses developed by the clock 152 to the clock input of the down counter 204. The down counter 204 decrements the loaded value provided by the memory 202 as clock pulses are received at the clock input. At a time $t_5$, the contents of the down counter 204 are decremented to zero, in turn causing the zero detect circuit 208 to develop a high state output. In response to this high state output, the one-shot 210 develops a negative-going pulse beginning at the time $t_5$ and extending for a predetermined duration until the time $t_6$.

Following the time $t_6$, the above-described sequence repeats.

As seen by an inspection of the waveforms developed by the one-shots 170 and 210, the leading edge of the pulses developed by the one-shots 170 lead the leading edge of the pulse developed by the one-shot 210 by a duration determined by the phase command value developed at the output of the memory 202. The separation between these times determines the angle $\alpha_2$ and is controlled by the magnitude of the deviation signal provided to the analog/digital converter 200.

The memories 180 of the LCU's 140, 142 and 144 are loaded with identical information so that the subinverters 70, 74 and 78 produce substantially identical waveforms, as do the subinverters 72, 76 and 80. However, the data are physically shifted in the memory locations of successive memories 180 so that the sets of waveforms produced by the subinverters 74 and 76 are shifted by a predetermined amount, such as 10°, relative to the sets of waveforms produced by the subinverters 70 and 72 and so that the sets of waveforms produced by the subinverters 78 and 80 are shifted by the same amount relative to the sets of waveforms produced by the subinverters 74 and 76 when the counter reset pulses for the LCU's 140, 142 and 144 developed by the one-shots 170 and 210 are simultaneously developed, i.e., when the times $t_1$ and $t_5$ are coincident. As the phase command value developed by the memory 202 increases to provide a delay between the times $t_1$ and $t_5$, the angle $\alpha_2$ increases, in turn causing the counters 172, 174 and 176 of the LCU 144 to be reset at later times relative to the counters of the LCU's 140 and 142. Changing the angle $\alpha_2$ in turn results in a change in the magnitude of the output voltages from the summing transformer 114. However, changing this angle also changes the harmonic content in the output. The degree of regulation which can be accomplished by the present invention may thus be limited by the degree of harmonic content permitted in the output of the inverter 24.

In the event the angle $\alpha_1$ is to be varied, the one-shot 170 of the LCU 142 is omitted and the reset inputs of the counters 172, 174, 176 of the LCU 142 receive the output of the circuit 150. Further, the LCU 144 includes a one-shot 170 and the synchronization inputs of the LCU's 140, 144 receive the first reference signal developed by the reference signal generator 148. Also, the memories of the LCU's 140, 144 are loaded with data which result in a constant angle $\alpha_3$ between the waveforms produced by the subinverters 70, 72 and 78, 80. The angle $\alpha_1$ would thus be variable to permit output voltage regulation.

It should be noted that the regulator circuit of the present invention is not limited to an inverter of the type illustrated in the figures. In fact, the circuit may be used to regulate the output of any inverter having first and second inverter sections that develop first and second AC waveforms which are phase displaced by a variable angle together and for combining the first and second waveforms to produce AC output power. For example, where the outputs of two 12-step inverters are to be combined to produce 24-step AC power, the phase displacement between the inverter outputs may be controlled by the regulator of the present invention to regulate output voltage. As a further example, where the angles $\alpha_1$, and $\alpha_2$ described herein are to be independently adjustable, two synchronizing circuits such as those disclosed herein may be utilized to obtain a more complex regulation scheme. The invention is equally applicable to other types of inverters, such as where the phase displacement between outputs of two 24-step inverters which are combined to obtain 48-step AC power is varied to accomplish output voltage regulation.

The digital design of the synchronization circuit 150 is simpler than previous regulation circuits and is less prone to environmental and aging effects. Further, noise filtering can be accomplished by loading appropriate data in the memory 202. The minimum phase shift obtainable can be accurately set by storing appropriate data in the lower address region of the memory 202. In addition, the data stored in the memory 202 can be used to linearize the function between $\alpha$ angle and the inverter output voltage.

Further modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit from the invention, and the exclusive use of all modifications which come within the scope of the appended claims is reserved.

We claim:

1. A circuit for producing an output signal having a transition between two states at a controlled phase displacement with respect to a transition between two states of a reference signal, comprising:
   means for deriving a phase command value representing a desired phase displacement between the transitions in the output signal and the reference signal;
   a counter coupled to the deriving means having a series of counter inputs that receive the phase command value, a load command input, a clock input and an output;
   means coupled to the load command input for causing the counter to load the phase command value at a time prior to the transition in the reference signal;
   a clock that develops a clock signal;
   a gating circuit having inputs that receive the clock signal and the reference signal and an output coupled to the clock input of the counter wherein the gating circuit provides a plurality of clock pulses to the clock input of the counter following the transition in the reference signal, the counter decrementing the loaded phase command value as clock pulses are received by the counter; and
   means coupled to the counter output for producing the output signal wherein the developing means produces the transition in the output signal when the loaded phase command value is decremented to a particular value.

2. The circuit of claim 1, wherein the causing means comprises a timing circuit responsive to a second reference signal identical to the first-named reference signal except shifted in time relative thereto.

3. The circuit of claim 1, wherein the deriving means comprises a memory having addressing inputs which receive an address and a series of outputs at which the phase command value is developed.

4. The circuit of claim 1, wherein the producing means comprises a zero detect circuit that produces a zero detect signal when the loaded phase command value is decremented to zero and a one-shot coupled to the zero detect circuit which develops a pulse in the output signal when the zero detect signal is produced.

5. The circuit of claim 4, wherein the gating circuit includes a flip-flop having a set input that receives the output signal, a reset input that receives the first reference signal and an output and an AND gate having a first input that receives the first reference signal, a second input that receives the clock signal, a third input coupled to the output of the flip-flop and an output coupled to the clock input of the counter.

6. A regulator circuit for an inverter having first and second inverter sections that develop first and second AC waveforms which are phase displaced by a variable angle $\alpha$ and means for combining the first and second waveforms to produce AC output power, comprising:
   first means for developing a reference signal having a transition between two states at a first time;
   second means for developing a deviation signal representing a deviation of a parameter of the AC output power from a particular level;
   a memory storing a plurality of words each representing a value of $\alpha$;
   means for accessing the memory with the deviation signal such that the memory provides a word at an output thereof representing a value of $\alpha$ corresponding to the deviation signal;
   a counter having counter inputs coupled to the memory, a clock input and an output;
   means coupled to the counter for causing the counter to load the word at a time prior to the first time;
   a gating circuit having an input coupled to the first developing means and operative beginning at the first time to provide a plurality of clock pulses to the clock input of the counter whereby the counter decrements the loaded word as the clock pulses are received by the counter;
   means coupled to the counter outputs for producing a synchronization signal having a transition between two states at a second time subsequent to the first time at which the loaded word is decremented to a particular value; and means coupled to the first and second inverter sections for controlling same in accordance with the reference signal and the synchronization signal such that the parameter of the AC output power is maintained substantially at the particular level.

7. The regulator circuit of claim 6, wherein the causing means comprises a timing circuit responsive to a second reference signal.

8. The circuit of claim 6, wherein the producing means comprises a zero detect circuit that produces a zero detect signal when the loaded word is decremented to zero and a one-shot coupled to the zero detect circuit which develops a pulse in the synchronization signal when the zero detect signal is produced.

9. The circuit of claim 6, further including a clock that produces a clock signal and wherein the gating circuit includes a flip-flop having a set input that receives the synchronization signal, a reset input that receives the reference signal and an output and an AND gate having a first input that receives the reference signal, a second input that receives the clock signal, a third input coupled to the output of the flip-flop and an output coupled to the clock input of the counter.

10. The regulator circuit of claim 6, wherein the accessing means comprises an analog/digital converter coupled between the second developing means and the memory.

11. A regulator circuit for a steppedwaveform inverter having first and second three-phase subinverters, a summing transformer having first and second sets of three-phase primary windings coupled to the first and second subinverters, respectively, and a set of three-phase secondary windings in which three-phase, summed AC output power is produced, the subinverters developing first and second sets of three-phase waveforms in the first and second sets of primary windings wherein the second set of waveforms is phase displaced by a variable angle α relative to the first set of waveforms, comprising:

first means for developing a first reference signal having a transition between two states at a first time;

second means for developing a deviation signal representing a deviation of a parameter of the AC output power from a particular level;

a memory storing a plurality of words each representing a value of α;

means for accessing the memory with the deviation signal such that the memory provides a word at an output thereof representing a value of α corresponding to the deviation signal;

a counter having counter inputs coupled to the memory, a clock input and an output;

a timing circuit responsive to a second reference signal for causing the counter to load the word at a time prior to the first time;

a gating circuit having an input coupled to the first developing means and operative beginning at the first time to provide a plurality of clock pulses to the clock input of the counter whereby the counter decrements the loaded word as the clock pulses are received by the counter;

a zero detect circuit that produces a zero detect signal when the loaded word is decremented to zero;

a one-shot coupled to the zero detect circuit which develops a pulse in a synchronization signal when the zero detect signal is produced; and means coupled to the first and second subinverters for controlling same in accordance with the reference signal and the synchronization signal such that the parameter of the AC output power is maintained substantially at the particular level.

12. The circuit of claim 11, further including a clock that produces a clock signal and wherein the gating circuit includes a flip-flop having a set input that receives the synchronization signal, a reset input that receives the first reference signal and an output and an AND gate having a first input that receives the first reference signal, a second input that receives the clock signal, a third input coupled to the output of the flip-flop and an output coupled to the clock input of the counter.

13. The regulator circuit of claim 11, wherein the accessing means comprises an analog/digital converter coupled between the second developing means and the memory.

14. The regulator circuit of claim 13, wherein the analog/digital converter is responsive to the timing circuit to supply a digital representation of the deviation signal to the memory prior to the first time.

15. The regulator circuit of claim 14, wherein the memory includes an enable input that receives a signal developed by the timing circuit whereby the memory provides the word at the memory output after the digital representation of the deviation signal is supplied to the memory.

16. A regulator circuit for a steppedwaveform inverter having first and second threephase subinverters, a summing transformer having first and second sets of three-phase primary windings coupled to the first and second subinverters, respectively, the first set of primary windings being connected in a wye configuration and the second set of primary windings being connected in a delta configuration and a set of three-phase secondary windings in which three-phase, summed AC output power is produced, the subinverters developing first and second sets of three-phase waveforms in the first and second sets of primary windings wherein the second set of waveforms is phase displaced by a variable angle relative to the first set of waveforms, comprising:

first means for developing a first reference signal having a transition between two states at a first time;

second means for developing a deviation signal representing a deviation of a parameter of the AC output power from a particular level;

a memory storing a plurality of words each representing a value of α;

means for accessing the memory with the deviation signal such that the memory provides a word at an output thereof representing a value of α corresponding to the deviation signal wherein the accessing means comprises an analog/digital converter coupled between the second developing means and the memory which supplies a digital representation of the deviation signal to the memory prior to the first time;

a counter having counter inputs coupled to the memory, a clock input and an output;

a timing circuit responsive to a second reference signal for causing the counter to load the word at a time prior to the first time;

wherein the memory includes an enable input that receives a signal developed by the timing circuit whereby the memory provides the word at the memory output after the digital representation of the deviation signal is supplied to the memory;

a clock that produces a clock signal;

a gating circuit responsive to the first developing means and the clock and operative beginning at the first time to provide a plurality of clock pulses to the clock input of the counter whereby the counter decrements the loaded word as the clock pulses are received by the counter;

a zero detect circuit that produces a zero detect signal when the loaded word is decremented to zero;

a one-shot coupled to the zero detect circuit which develops a pulse in a synchronization signal when the zero detect signal is produced;

wherein the gating circuit includes a flip-flop having a set input that receives the synchronization signal, a reset input that receives the first reference signal and an output and an AND gate having a first input that receives the first reference signal, a second input that receives the clock signal, a third input coupled to the output of the flip-flop and an output coupled to the clock input of the counter; and means coupled to the first and subinverters for controlling same in accordance with the reference signal and the synchronization signal such that the parameter of the AC output power is maintained substantially at the particular level.

* * * * *